(12) United States Patent
Wu et al.

(10) Patent No.: US 11,084,726 B2
(45) Date of Patent: Aug. 10, 2021

(54) GRAPHENE ADDITIVES AND METHODS OF PREPARING THE SAME

(71) Applicant: Enerage Inc., Wujie Township, Yilan County (TW)

(72) Inventors: Mark Y. Wu, Wujie Township, Yilan County (TW); Cheng-Yu Hsieh, Wujie Township, Yilan County (TW); Geng Wei Lin, Wujie Township, Yilan County (TW)

(73) Assignee: ENERAGE INC., Wujie Township, Yilan County (TW)

( * ) Notice: Subject to any disclaimer, the term of this patent is extended or adjusted under 35 U.S.C. 154(b) by 141 days.

(21) Appl. No.: 16/536,040

(22) Filed: Aug. 8, 2019

(65) Prior Publication Data

US 2019/0359489 A1 Nov. 28, 2019

Related U.S. Application Data

(63) Continuation-in-part of application No. 15/868,283, filed on Jan. 11, 2018, now Pat. No. 10,427,942.

(30) Foreign Application Priority Data

Oct. 25, 2017 (TW) .................................. 106136611

(51) Int. Cl.
 *C01B 32/194* (2017.01)
 *C08K 9/06* (2006.01)
 (Continued)

(52) U.S. Cl.
 CPC ............ *C01B 32/194* (2017.08); *C08K 3/042* (2017.05); *C08K 9/06* (2013.01); *C10M 139/04* (2013.01);
 (Continued)

(58) Field of Classification Search
 CPC .............. C01B 32/194; C01B 2204/04; C01B 2204/32; C09J 9/02; C01P 2006/22;
 (Continued)

(56) References Cited

U.S. PATENT DOCUMENTS

| | | |
|---|---|---|
| 5,990,211 A | 11/1999 | Yano |
| 7,625,975 B2 | 12/2009 | Barfurth et al. |
| 7,745,528 B2 | 6/2010 | Prud'Homme et al. |

(Continued)

FOREIGN PATENT DOCUMENTS

| | | |
|---|---|---|
| CN | 101864098 B | 1/2012 |
| CN | 106185895 A | 12/2016 |
| CN | 106221128 A | 12/2016 |

OTHER PUBLICATIONS

Atif, Rasheed, et al., "Reasons and remedies for the agglomeration of multilayered graphene and carbon nanotubes in polymers", Beilstein Journal of Nanotechnology, 2016, pp. 1174-1196, Bielstein-Institut zur Förderung der Chemischen Wissenschaften.

(Continued)

*Primary Examiner* — Mark Kopec
*Assistant Examiner* — Jaison P Thomas
(74) *Attorney, Agent, or Firm* — Muncy, Geissler, Olds & Lowe, P.C.

(57) ABSTRACT

Provided is a graphene additive, having a viscosity between 1000 and 40000 cps and a grind fineness not greater than 15 μm, and comprising: nano-graphene sheets and a silane coupling agent, wherein a weight ratio of the nano-graphene sheets to the silane coupling agent is 0.1-15:99.9-85, and carbon atoms on a surface of the nano-graphene sheets form chemical bonds Si—O—C with oxygen substituents of the silane coupling agent. The present application further provides a method of preparing the graphene additive.

8 Claims, 1 Drawing Sheet

(51) Int. Cl.
*C08K 3/04* (2006.01)
*C10M 139/04* (2006.01)
*B82Y 40/00* (2011.01)
*B82Y 30/00* (2011.01)

(52) U.S. Cl.
CPC .............. *B82Y 30/00* (2013.01); *B82Y 40/00* (2013.01); *C01B 2204/04* (2013.01); *C01B 2204/32* (2013.01); *C01P 2004/24* (2013.01); *C01P 2006/11* (2013.01); *C01P 2006/22* (2013.01); *C10M 2227/04* (2013.01)

(58) Field of Classification Search
CPC .............. C01P 2004/11; C01P 2004/13; C01P 2004/24; C01P 2006/11; H01B 1/04; B82Y 30/00; B82Y 40/00; C08K 3/042; C08K 9/06; C10M 125/02; C10M 139/04; C10M 2201/041; C10M 2227/04; C10N 2020/02; C10N 2020/06; C10N 2030/06
See application file for complete search history.

(56) References Cited

U.S. PATENT DOCUMENTS

| | | |
|---|---|---|
| 2013/0150516 A1* | 6/2013 | Lettow .................. C08L 21/00 524/495 |
| 2015/0299437 A1 | 10/2015 | Mruk et al. |
| 2015/0333320 A1 | 11/2015 | Tamaki et al. |
| 2017/0202967 A1* | 7/2017 | Liu ........................ B01J 21/08 |
| 2017/0312695 A1 | 11/2017 | Majumder et al. |
| 2018/0010260 A1 | 1/2018 | Hersam et al. |
| 2018/0134902 A1 | 5/2018 | Wu et al. |
| 2019/0031513 A1 | 1/2019 | Zhou et al. |
| 2019/0067700 A1 | 2/2019 | Wu et al. |
| 2019/0233702 A1* | 8/2019 | Xu .......................... C09C 1/46 |
| 2020/0087850 A1* | 3/2020 | Wu .......................... D06N 3/14 |

OTHER PUBLICATIONS

Morimoto, Naoki, et al., "Tailoring the Oxygen Content of Graphite and Reduced Graphene Oxide for Specific Applications," Scientific Reports, 6, 21715; doi: 10.1038/srep21715, Feb. 25, 2016, pp. 1-8.

* cited by examiner

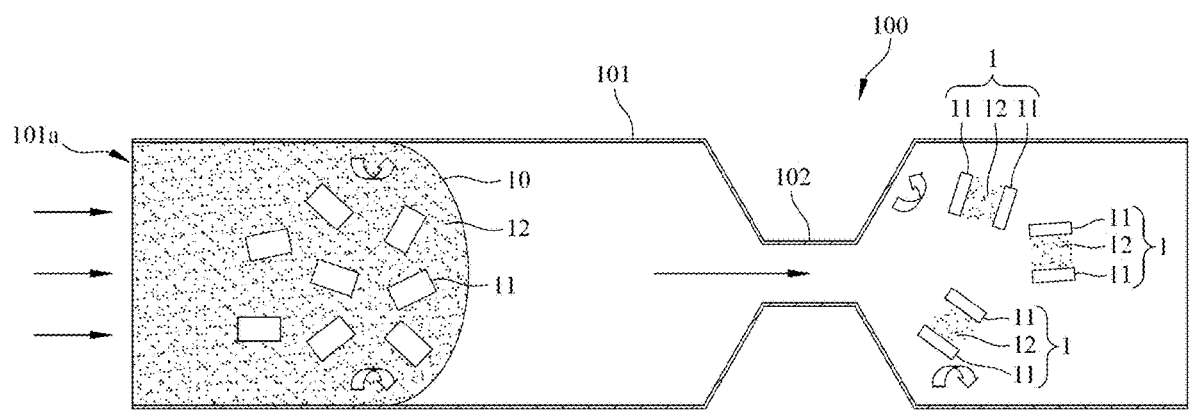

GRAPHENE ADDITIVES AND METHODS OF PREPARING THE SAME

CROSS-REFERENCE TO RELATED APPLICATION

This application is a continuation-in-part of application Ser. No. 15/868,283 filed on Jan. 11, 2018, which claims foreign priority to Taiwan patent application No. 106136611, filed on Oct. 25, 2017. All of the above-referenced applications are hereby incorporated herein.

BACKGROUND OF THE INVENTION

1. Field of the Invention

The present application relates to a graphene additive and a method of preparing the same.

2. The Prior Arts

Graphene has a two-dimensional crystal structure constituted by $sp^2$ hybrid orbitals in an arrangement of hexagonal honeycombs, a thickness of the graphene is only 0.335 nm (i.e. equal to a diameter of a carbon atom), a specific gravity thereof is one quarter of steel, a mechanical strength thereof is higher than hundred times of the steel, it is the known material having the highest mechanical strength, and has excellent properties of electrical conductivity, thermal conductivity and chemical resistance. Therefore, the graphene is continuously applied to different technology fields of industries.

However, the most common problem in practical applications is that the graphene sheets are easy to aggregate, stack and agglomerate, even if they have just been dispersed; especially, when the graphene sheets are mixed with materials of high viscosity (e.g. plastics, rubbers), the graphene sheets are hard to be uniformly dispersed therein, so the problem of graphene aggregation becomes more serious. To prevent the graphene sheets from aggregation and to uniformly disperse the graphene sheets in target materials have been the technical bottlenecks that the industries need to solve.

U.S. publication No. 20150299437A1 discloses a method that the dispersibility of the graphene or carbon nanotubes in the rubber materials is increased by adding an elastomer containing specific functional groups. However, the respective rubber products have specific formulations; the elastomer containing specific functional groups added therein probably affect performance of the rubber products. U.S. Pat. No. 7,745,528B2 discloses a method of manufacturing a graphene-rubber composite, which includes a step of thermally reducing a graphite oxide to form functional groups on a surface of the graphene, so as to increase affinity between the graphene and the rubber. However, this patent fails to solve the problems of aggregation and dispersion of the graphene sheets.

U.S. Pat. No. 5,990,211 discloses a rubber mixing process, which includes steps of mixing the rubber, a silicon dioxide filler and a silane coupling agent under specific conditions, and forming chemical bonds between the silicon dioxide filler and the rubber, so as to improve the performance of the rubber material. U.S. Pat. No. 7,625,975B2 discloses a silane coupling agent, which can reinforces the bonding between the filler and the rubber, so as to improve the performance of the rubber.

The silane coupling agent can improve the properties of the rubbers, lubricating oils and specific plastic materials, but there is no relative technology about dispersing the graphene sheets in the silane coupling agent at the present time. A main aspect of the present application is to improve the dispersibility of the graphene in the rubbers, the lubricating oils, or the plastic materials to enhance the performances of the products by introducing the graphene and the silane coupling agent to manufacturing processes of the products.

SUMMARY OF THE INVENTION

To achieve the aforesaid aspect, the present application provides a graphene additive having a viscosity between 1000 and 40000 cps and a grind fineness not greater than 15 and including nano-graphene sheets and a silane coupling agent, wherein a weight ratio of the nano-graphene sheets to the silane coupling agent is 0.1-15:99.9-85, and carbon atoms on a surface of the nano-graphene sheets form chemical bonds Si—O—C with oxygen substituents of the silane coupling agent.

In an embodiment, the silane coupling agent is selected from at least one of bis-(3-y-(triethoxysilyl)propyl)tetrasulfide, octadecyl trimethylsilane, hexadecyl trimethoxy silane, dodecyl trimethylsilane, 3-octanoylthio-1-propyltrimethyl silane, 3-Octanoylthio-1-propyltriethoxy silane and vinyl trimethylsilane.

In an embodiment, each the nano-graphene sheet has a plurality of graphene layers, a bulk density of 0.005-0.05 $g/cm^3$, a thickness of 0.68-10 nm, and a plane lateral size of 1-100 μm.

In an embodiment, the graphene additive further includes a processing oil selected from at least one of treated distillate aromatic extracted processing oils, paraffin base processing oils, aromatic base processing oils and naphthenic base processing oils.

To achieve the aforesaid aspect, the present application provides a method of preparing a graphene additive including: mixing and stirring nano-graphene sheets and a silane coupling agent, to form a graphene-silane fluid, wherein each the nano-graphene sheet has a plurality of graphene layers; placing the graphene-silane fluid in a fluid channel having a slit, wherein a width of the fluid channel is not greater than 500 and a width of the slit is not greater than 50 on a direction perpendicular to a flowing path of the graphene-silane fluid; propelling the graphene-silane fluid in the fluid channel to pass through the slit by applying a pressure not less than 8000 psi to the graphene-silane fluid, and exfoliating the plurality of graphene layers of the nano-graphene sheets; and allowing carbon atoms on a surface of the exfoliated nano-graphene sheets form chemical bonds Si—O—C with oxygen substituents of the silane coupling agent, to form a graphene additive having a viscosity between 1000 and 40000 cps.

The present application utilizes rheological properties of the fluids, a pressure not less than 8000 psi is applied to the graphene-silane fluid in the fluid channel to form turbulent flows, so as to uniformly mix the nano-graphene sheets and the silane coupling agent; then, the graphene-silane fluid passes through the slit of the width not greater than 50 μm in the fluid channel, the shear force and the force of cavitation effect, which are generated by the graphene-silane fluid passing through the slit then entering the fluid channel, are greater than van der Waals force between the graphene layers, some of the graphene layers can be exfoliated to form the nano-graphene sheets of fewer graphene layers, and a temperature of the graphene-silane fluid is increased at the same time; the carbon atoms on the exfoliated nano-graphene sheets jump to a highly active state, and rapidly react with highly active oxygen substituents of the silane coupling agent to form the chemical bonds Si—O—C, so that the graphene additive according to the present application is obtained. The nano-graphene sheets, which form chemical bonds with the silane coupling agent, have steric effect between each other, so that the nano-graphene sheets in the silane coupling agent can maintain dispersion status for a long time. The graphene additive according to the present application can solve the problems of the current technologies, and effectively increase the dispersibility of the nano-graphene sheets in the rubber, lubricating oil and plastic materials.

BRIEF DESCRIPTION OF THE DRAWINGS

FIGURE is a cross-sectional view schematically illustrating a dispersing equipment for preparing the graphene additive according to the present application.

DETAILED DESCRIPTION OF PREFERRED EMBODIMENTS

The technical features and other advantages of the present application will become more readily apparent to those ordinarily skilled in the art, by referring the following detailed description of embodiments of the present application in conjunction with the accompanying drawing. In order to further clarify the technical means adopted in the present application and the effects thereof, the FIGURES schematically illustrate the relative relationship between the main elements, but is not based on the actual size; therefore, thickness, size, shape, arrangement and configuration of the main elements in the FIGURE are only for reference, not intended to limit the scope of the present application.

In details, there are various flow statuses of the fluid flowing in the fluid channel, distinguished by Reynolds number, when Reynolds number of the fluid is greater than 4000, the flow status is turbulent, which represents that the fluid flows on the direction along external pressure, and generates spiral motions due to internal vortex. The nano-graphene sheets can be uniformly dispersed in the silane coupling agent by utilizing the effects of turbulent flows. When the pressure of propelling the fluid is greater than a certain value, and the fluid enters the slit of the width sharply narrowed, the fluid will withstand extremely high shear force; when the fluid passed through the slit, and enters the fluid channel of the width greater than the slit, many bubbles will form in the fluid due to the shear force instantaneously disappeared that is like the cavitation effect generated by ultrasonic waves. The graphene layers attract each other by van der Waals force to form the nano-graphene sheets, when the shear force and the force of the cavitation effect are greater than van der Waals force between the graphene layers, some of the graphene layers can be exfoliated to form the nano-graphene sheets of fewer graphene layers. The carbon atoms on the exfoliated nano-graphene sheets jump to the highly active state, and the high shear force and the cavitation effect generated by the fluid are accompanied with a high temperature; at this time, a pair of free electrons of the oxygen substituent of the silane coupling agent is easy to form chemical bond Si—O—C with the highly active carbon atom on the surface of the nano-graphene sheets, the chemical bond Si—O—C significantly reduces surface energy of the exfoliated nano-graphene sheets and van der Waal force therebetween, and the silane coupling agent has the steric effect between the exfoliated nano-graphene sheets to prevent re-aggregation. The present application utilizes the aforesaid properties of fluids to uniformly disperse the nano-graphene sheets in the silane coupling agent, and allows the chemical bond forming between the nano-graphene sheets and the silane coupling agent, to prepare the graphene additive, in which the silane coupling agent can reinforce wettability and weatherability of the rubbers, and the nano-graphene sheets can enhance the mechanical strength of the rubbers, so as to increase service lifetime and performances of the rubber, lubricating oil and plastic products.

A method of preparing a graphene additive includes following steps: mixing and stirring nano-graphene sheets and a silane coupling agent, to form a graphene-silane fluid, wherein each the nano-graphene sheet has a plurality of graphene layers; placing the graphene-silane fluid in a fluid channel having a slit, wherein a width of the fluid channel is not greater than 500 and a width of the slit is not greater than 50 on a direction perpendicular to a flowing path of the graphene-silane fluid; propelling the graphene-silane fluid in the fluid channel to pass through the slit by applying a pressure not less than 8000 psi, exfoliating the plurality of graphene layers of the nano-graphene sheets, and allowing carbon atoms on a surface of the exfoliated nano-graphene sheets form chemical bonds Si—O—C with oxygen substituents of the silane coupling agent, to form a graphene additive having a viscosity between 1000 and 40000 cps.

For preparing the graphene additive, firstly, each the nano-graphene sheet has a plurality (e.g. 2 to 30) of graphene layers, a bulk density of 0.005-0.05 g/cm$^3$, a thickness of 0.68-10 nm, a plane lateral size of 1-100 and the silane coupling agent is selected from at least one of bis-(3-y-(triethoxysilyl)propyl)tetrasulfide, octadecyl trimethylsilane, hexadecyl trimethoxy silane, dodecyl trimethylsilane, 3-octanoylthio-1-propyl trim ethyl silane, 3-Octanoylthio-1-propyltriethoxy silane and vinyl trimethylsilane. In general, a viscosity of the silane is less than 1000 cps, but the graphene has a property of high oil absorption that can rapidly increase the viscosity of the graphene-silane fluid; therefore, a weight ratio of the nano-graphene sheets to the silane coupling agent is 0.05-20:99.5-80, for example not limited to 0.1:99, or 15:85. An excessive content of the nano-graphene sheets make the viscosity of the graphene-silane fluid too high that reduces the effect of exfoliating the nano-graphene sheets and formation of the chemical bonds between the nano-graphene sheets and the silane coupling agent, and thus the dispersibility of the nano-graphene sheets is affected. A too low content of the nano-graphene sheets cannot achieve the effect of improving the product performance.

Secondly, the nano-graphene sheets and the silane coupling agent are placed in a mixing equipment (for example not limited to a homogenizer) according to the predetermined weight ratio, the nano-graphene sheets are preliminarily dispersed in the silane coupling agent by the shear force of the mixing equipment, and the graphene-silane fluid is formed, which has fluidity of the viscosity between 1,000 and 40,000 cps.

FIGURE is a cross-sectional view schematically illustrating a dispersing equipment for preparing the graphene additive according to the present application. As shown in FIGURE, the graphene-silane fluid 10, which includes the nano-graphene sheets 11 and the silane coupling agent 12, is placed in the dispersing equipment 100 (for example not limited to a three-roll mill), which includes a pressurizing unit (not shown), a fluid channel 101 and an adjustable slit 102, wherein the slit 102 is disposed in middle portion of the fluid channel 101. On a direction parallel to a fluid flowing path (as indicated by the straight arrow in FIGURE), a length from an inlet 101a of the fluid channel 101 to the slit 102 is about 1 meter; on a direction perpendicular to the fluid flowing path, the width of the fluid channel 101 is not greater than 500 μm, and the width of the slit 102 is not greater than 50 μm.

Then, the pressure not less than 8000 psi is applied to the graphene-silane fluid 10, to allow the turbulent flows form in the fluid channel 101 (as indicated by the spiral arrow in FIGURE), by continuously applying the pressure thereto, the graphene-silane fluid 10 passes through the slit 102 of the width sharply narrowed; the pressure, the shear force and the cavitation effect generated by that the graphene-silane fluid 10 passes through the slit 102 exfoliate some of the graphene layers of the nano-graphene sheets 11. The carbon atoms of the exfoliated nano-graphene sheets have high activity, and the graphene-silane fluid 10 under the shear force and the cavitation effect will liberate heat; generally, a temperature of the graphene-silane fluid 10 passed through the slit can rise above 60 degree Celsius, the exfoliated nano-graphene sheets 11 easily react with highly active functional group Si—O of the silane 12 coupling agent to form the chemical bond Si—O—C at such temperature, so that the exfoliated nano-graphene sheets can be stably dispersed in the silane coupling agent to obtain the graphene additive 1.

It is noted that the graphene additive according to the present application can maintain the dispersibility and properties of the nano-graphene sheets for a long time, and be easily stored and transported. A grind fineness meter can be used to measure dispersion degree of materials in a composite, and the smaller value represents the higher dispersibility. With the grind fineness meter to actually measure the grind fineness of the graphene additive according to the present application, the measured value thereof is not greater than 15 μm (for example: 5-15 μm); in contrast, a measured value of a mixture of the nano-graphene sheets and the silane coupling agent (i.e. no chemical bond between the nano-graphene sheets and the silane coupling agent) prepared by a conventional dispersing process is not less than 25 μm (such the measured value represents that the nano-graphene sheets aggregate to form graphite sheets). It can be seen that the graphene additive according to the present application can maintain the nano-graphene sheets uniformly dispersed for a long time The graphene additive according to the present application can be widely applied to various rubber composites for the different rubber products (such as vehicle tires, shoe outsoles, crawlers, conveyor belts of machine tools) to enhance mechanical (e.g. stretching, tearing, abrading) and physical (e.g. antistatic, thermal conductive) properties thereof. Moreover, the silane coupling agents having long carbon chain have better affinity with the oil products (e.g. lubricating oils, lubricating esters), so that the graphene additive including the silane coupling agent having long carbon chain can improve the lubricity of the oil products.

In the manufacturing process of the rubbers, the graphene additive according to the present application can be directly added to the rubber materials during the mixing step. In general, an addition ratio of the graphene additive is 0.1-10 phr (parts per hundreds of rubber). If the viscosity of the graphene additive is too great to be uniformly dispersed in the rubber material, a rubber processing oil can be used for diluting the graphene additive, and then the rubber material is mixed with the diluted graphene additive added therein. The rubber processing oil can be selected from any one of treated distillate aromatic extracted processing oils, paraffinic base oils, aromatic base oils and naphthenic base oils, which are compatible with the silane.

In an embodiment of the shoe outsole rubber, the present application provides a rubber composite including the graphene additive, a rubber mixture, a rubber processing oil and a filler. The graphene additive includes the nano-graphene sheets and the silane coupling agent, the nano-graphene sheets form chemical bonds Si—O—C with the silane coupling agent, the weight ratio of the nano-graphene sheets to the silane coupling agent is 0.1-15:99.9-85, and the graphene additive has the viscosity between 1000 and 40000 cps and the grind fineness not greater than 15 μm. The rubber mixture includes at least two of cis-1, 3-polybutadiene rubber, styrene-butadiene rubber, natural rubber, nitrile rubber. The rubber processing oil is, for example not limited to, treated distillate aromatic extracted processing oils, paraffin base processing oils, aromatic base processing oils, naphthenic base processing oils, or a combination thereof. The filler is, for example not limited to, zinc oxide, silicon dioxide, or a combination thereof.

In order that those skilled in the art can more clearly understand various applications and effects of the present application, the practical operations of the present application will be specifically illustrated in details with following exemplary embodiments.

Embodiment 1: The Shoe Outsole Rubber

Step of preparing the graphene additive: the nano-graphene sheets of 10 wt % and bis-(3-y-(triethoxysilyl)propyl) tetrasulfide of 90 wt % are added to a homogenizer, mixed for 1 hour, and the graphene-silane fluid having the viscosity of 5500 cps is formed; the graphene-silane fluid is fed into the fluid channel of 500 μm width with a peristaltic pump, the pressure of 8000 psi is applied to the graphene-silane fluid to allow the graphene-silane fluid pass through the slit of 50 μm width, so that the graphene additive is obtained.

Step of diluting the graphene additive: the graphene additive is added to and uniformly mixed with the paraffin base processing oil in the homogenizer, and the viscosity of the graphene additive is diluted to 1500 cps.

Step of mixing the graphene additive and the rubber mixture: the rubber mixture of natural rubber, cis-1, 3-polybutadiene rubber, styrene-butadiene rubber and solution polymerized styrene-butadiene rubber is fed into a mixer, and then the diluted graphene additive is added to and mixed with the rubber mixture in the mixer; the fillers of silicon dioxide and zinc oxide are added thereto during mixing the rubber mixture and the diluted graphene additive, and the rubber composite is obtained. Based on the content of the rubber mixture as 100 phr, the composition of the rubber composite is as follows: the graphene additive of 5-10 phr, the paraffin base processing oil of 5-10 phr, the filler of silicon dioxide of 4-6 phr, and the filler of zinc oxide of 4-6 phr; the rubber composite is uniformly mixed at a temperature of 120-140 degree Celsius, and a raw graphene rubber is obtained.

Step of vulcanizing and molding the raw graphene rubber: the raw graphene rubber and sulfur are placed and mixed in a twin-screw extruder at a temperature between 70 and 90 degree Celsius; the raw graphene rubber mixed with the sulfur is placed in a mold, vulcanization and molding of the raw graphene rubber are performed at a temperature between 130 and 150 degree Celsius, and the shoe outsole rubber is obtained. A test result of the shoe outsole rubber of Embodiment 1 is shown in Table 1.

TABLE 1

|  | Content of the graphene additive (by weight ratio) | | |
| --- | --- | --- | --- |
|  | 0 phr | 5 phr | 10 phr |
| Wear resistance (mm$^3$) at 10 N load | 94 | 93 | 88 |
| Tensile strength (Kgf/cm$^2$) | 132 | 97 | 141 |
| Elongation (%) | 2000 | 2070 | 2132 |
| Tearing strength (Kgf/cm) | 31.5 | 53.1 | 61.6 |

As shown in Table 1, the graphene can enhance the wear resistance and mechanical properties of the rubber, and the addition of 10 phr can significantly improve the performance of the rubber due to the nano-graphene sheets uniformly dispersed in the rubber.

Embodiment 2: The Shoe Rubber

Step of preparing the graphene additive: the nano-graphene sheets of 8 wt % and bis-(3-y-(triethoxysilyl)propyl) tetrasulfide of 92 wt % are added to the homogenizer, mixed for 1 hour, and the graphene-silane fluid having the viscosity of 3000 cps is formed; the graphene-silane fluid is fed into the fluid channel of 500 μm width with the peristaltic pump, the pressure of 8000 psi is applied to the graphene-silane fluid to allow the graphene-silane fluid pass through the slit of 50 μm width, so that the graphene additive is obtained. The grind fineness, measured with the grind fineness meter, of the graphene additive of Embodiment 2 is 12 μm.

Step of diluting the graphene additive: the graphene additive is added to and uniformly mixed with the paraffin base processing oil in the homogenizer, and the viscosity of the graphene additive is diluted to 1500 cps.

Step of mixing the graphene additive and the rubber mixture: the rubber mixture of natural rubber, cis-1, 3-polybutadiene rubber, styrene-butadiene rubber and SK-3S rubber is fed into the mixer, and then the diluted graphene additive is added to and mixed with the rubber mixture in the mixer; the fillers of silicon dioxide and zinc oxide are added thereto during mixing the rubber mixture and the diluted graphene additive, and the rubber composite is obtained. Based on the content of the rubber mixture as 100 phr, the composition of the rubber composite is as follows: the graphene additive of 6.25 phr, the paraffin base processing oil of 5 phr, the filler of silicon dioxide of 50 phr, and the filler of zinc oxide of 5 phr; the rubber composite is uniformly mixed at the temperature of 120-140 degree Celsius, and the raw graphene rubber is obtained.

Step of vulcanizing and molding the raw graphene rubber: the raw graphene rubber and the sulfur are placed and mixed in the twin-screw extruder at the temperature between 70 and 90 degree Celsius; the raw graphene rubber mixed with the sulfur is placed in the mold, vulcanization and molding of the raw graphene rubber are performed at the temperature between 130 and 150 degree Celsius, and the shoe rubber is obtained. A test result of the shoe rubber of Embodiment 2 is shown in Table 2.

TABLE 2

|  | Content of the graphene additive | |
| --- | --- | --- |
|  | 0 phr | 6.25 phr |
| DIN wear resistance | 121 | 118 |
| Tensile strength (Kgf/cm$^2$) | 118 | 131 |
| Elongation (%) | 465 | 505 |
| Tearing strength (Kgf/cm) | 56 | 59 |

As shown in Table 2, even the rubber of different compositions, the graphene can enhance the wear resistance and mechanical properties thereof, and the addition of 6.25 phr can significantly improve the performance of the shoe rubber due to the nano-graphene sheets uniformly dispersed in the rubber.

In an embodiment of the vehicle tire, the present application provides the rubber composite including the graphene additive, the rubber mixture, the rubber processing oil and the filler. The graphene additive includes the nano-graphene sheets and the silane coupling agent, the nano-graphene sheets form chemical bonds Si—O—C with the silane coupling agent, the weight ratio of the nano-graphene sheets to the silane coupling agent is 0.1-15:99.9-85, and the graphene additive has the viscosity between 1000 and 40000 cps and the grind fineness not greater than 15 The rubber mixture includes at least two of cis-1, 3-polybutadiene rubber, styrene-butadiene rubber, natural rubber, nitrile rubber. The rubber processing oil is, for example not limited to, treated distillate aromatic extracted processing oils, paraffin base processing oils, aromatic base processing oils, naphthenic base processing oils, or a combination thereof. The filler is, for example not limited to, zinc oxide, silicon dioxide, carbon black, or a combination thereof.

Embodiment 3: The Vehicle Tire Rubber

Step of preparing the graphene additive: the nano-graphene sheets of 15 wt % and 3-octanoylthio-1-propyltriethoxy silane of 85 wt % are added to the homogenizer, mixed for 1 hour, and the graphene-silane fluid having the viscosity of 30000 cps is formed; the graphene-silane fluid is fed into the fluid channel of 200 μm width with a diaphragm pump, the pressure of 12000 psi is applied to the graphene-silane fluid to allow the graphene-silane fluid pass through the slit of 50 μm width, so that the graphene additive is obtained. The grind fineness, measured with the grind fineness meter, of the graphene additive of Embodiment 3 is 15 μm.

Step of diluting the graphene additive: the graphene additive is added to and uniformly mixed with the treated distillate aromatic extracted processing oil in the homogenizer, and the viscosity of the graphene additive is diluted to 3000 cps.

Step of mixing the graphene additive and the rubber mixture: the rubber mixture of natural rubber, cis-1, 3-polybutadiene rubber and styrene-butadiene rubber is fed into the mixer, and then the diluted graphene additive is added to and mixed with the rubber mixture in the mixer; the fillers of silicon dioxide, zinc oxide and carbon black are added thereto during mixing the rubber mixture and the diluted graphene additive, and the rubber composite is obtained. Based on the content of the rubber mixture as 100 phr, the composition of the rubber composite is as follows: graphene additive of 0.5-5 phr, the processing oil of 10 phr, the filler of silicon dioxide of 45 phr, the filler of zinc oxide of 5 phr, and the filler of carbon black of 5 phr; the rubber composite is uniformly mixed at the temperature of 120-140 degree Celsius, and the raw graphene rubber is obtained.

Step of vulcanizing and molding the raw graphene rubber: the raw graphene rubber and the sulfur are placed and mixed in the twin-screw extruder at the temperature between 70 and 90 degree Celsius; the raw graphene rubber mixed with the sulfur is placed in the mold, vulcanization and molding of the raw graphene rubber are performed at the temperature between 130 and 150 degree Celsius, and the vehicle tire rubber is obtained. A test result of the vehicle tire rubber of Embodiment 3 is shown in Table 3.

TABLE 3

| | Content of the graphene additive | | |
|---|---|---|---|
| | 0 phr | 3.5 phr | 10 phr |
| DIN wear resistance | 84 | 70 | 104 |
| Tensile strength (Kgf/cm$^2$) | 107 | 130 | 148 |
| Elongation (%) | 523 | 433 | 606 |
| Tensile strength (Kgf/cm) | 52 | 74 | 74 |
| Tensile strength at 300% elongation | 53 | 85 | 67 |

As shown in Table 3, for the different rubber compositions applied to different rubber products, the graphene can still enhance the wear resistance and mechanical properties thereof, and the low addition (e.g. 3.5 phr) can significantly improve the performance of the rubbers due to the nano-graphene sheets uniformly dispersed in the rubber, but an excessive addition of the graphene may cause a decrease in performance thereof.

Embodiment 4: The Crawler Rubber

Step of preparing the graphene additive: the nano-graphene sheets of 15 wt % and bis-(3-y-(triethoxysilyl)propyl) tetrasulfide of 85 wt % are added to the homogenizer, mixed for 1 hour, and the graphene-silane fluid having the viscosity of 30000 cps is formed; the graphene-silane fluid is fed into the fluid channel of 200 μm width with the diaphragm pump, the pressure of 12000 psi is applied to the graphene-silane fluid to allow the graphene-silane fluid pass through the slit of 50 μm width, so that the graphene additive is obtained. The grind fineness, measured with the grind fineness meter, of the graphene additive of Embodiment 4 is 15 μm.

Step of diluting the graphene additive: the graphene additive is added to and uniformly mixed with a cycloalkyl base processing oil in the homogenizer, and the viscosity of the graphene additive is diluted to 3000 cps.

Step of mixing the graphene additive and the rubber mixture: the rubber mixture of natural rubber, cis-1, 3-polybutadiene rubber and chloroprene rubber is fed into the mixer, and then the diluted graphene additive is added to and mixed with the rubber mixture in the mixer; the fillers of silicon dioxide and carbon black are added thereto during mixing the rubber mixture and the diluted graphene additive, and the rubber composite is obtained. Based on the content of the rubber mixture as 100 phr, the composition of the rubber composite is as follows: the graphene additive of 2-10 phr, the processing oil of 5 phr, the filler of silicon dioxide of 10 phr, and the filler of carbon black of 45 phr; the rubber composite is uniformly mixed at the temperature of 120-140 degree Celsius, and the raw graphene rubber is obtained.

Step of vulcanizing and molding the raw graphene rubber: the raw graphene rubber and the sulfur are placed and mixed in the twin-screw extruder at the temperature between 80 and 100 degree Celsius; the raw graphene rubber mixed with the sulfur is placed in the mold, vulcanization and molding of the raw graphene rubber are performed at the temperature between 160 and 170 degree Celsius, and the crawler rubber is obtained. The mechanical properties of the crawler rubber of Embodiment 4 before and after an aging test (at 100 degree Celsius environment for 100 hours) are shown in Table 4.

TABLE 4

| | | Content of the graphene additive | | |
|---|---|---|---|---|
| | Aging test | 0 phr | 1.33 phr | 3.33 phr |
| Tensile strength (Kg/cm$^2$) | before | 204 | 269 | 256 |
| | after | 176 | 223 | 213 |
| Elongation (%) | before | 400 | 659 | 640 |
| | after | 300 | 468 | 455 |
| Tensile stress at 400% elongation (Kg/cm$^2$) | — | 141 | 161 | 155 |

As shown in Table 4, the graphene helps to improve the mechanical strength of the crawler rubber for carriers, and to slow down the performance degradation caused by rubber aging.

In an embodiment of the conveyor belt rubber, the present application provides the rubber composite including the rubber of 10-60 wt %, the fillers of carbon black and zinc oxide, cotton yarns and the graphene additive of 0.01-40 wt %. The graphene additive includes the nano-graphene sheets and the silane coupling agent, the nano-graphene sheets form chemical bonds Si—O—C with the silane coupling agent, and a ratio of the plane lateral size of the nano-graphene sheet to the diameter of the cotton yarn is between 0.1 and 10. The rubber can be formed with a polymerization or a crosslinking performed by heating or irradiating raw materials with ultraviolet, the rubber is selected from at least one of nitrile rubbers, hydrogenated nitrile rubbers, silicon rubbers, fluorine rubbers, ethylene-propylene-diene-terpolymer (EPDM), fluorosilicon rubbers, styrene butadiene rubbers, neoprene rubbers, acrylic ester rubbers, natural rubbers, chlorosulfonated polyethylene rubbers, butyl rubbers, and polyurethane rubbers.

Embodiment 5: The Conveyor Belt Rubber

Step of preparing the graphene additive: the nano-graphene sheets of 8 wt % and hexadecyl trimethoxy silane of 92 wt % are added to the homogenizer, mixed for 1 hour, and the graphene-silane fluid having the viscosity of 4000 cps is formed; the graphene-silane fluid is fed into the fluid channel of 500 μm width with the peristaltic pump, the pressure of 10000 psi is applied to the graphene-silane fluid to allow the graphene-silane fluid pass through the slit of 50 μm width, so that the graphene additive is obtained. The grind fineness, measured with the grind fineness meter, of the graphene additive of Embodiment 5 is 15 μm.

Step of diluting the graphene additive: the graphene additive is added to and uniformly mixed with the aromatic base processing oil in the homogenizer, and the viscosity of the graphene additive is diluted to 1000 cps.

Step of mixing the graphene additive and the rubber mixture: the graphene additive of 1-20 parts by weight, the neoprene rubber of 100 parts by weight, a reinforced carbon black of 60 parts by weight and the zinc oxide of 5 parts by weight are added, mixed and dispersed in the mixer; the cotton yarns of 15 parts by weight are added therein, and a rubber raw material having antistatic property is formed, wherein the nano-graphene sheets accounts for 0.01-3 wt % of the rubber raw material.

Step of vulcanizing and molding the raw graphene rubber: the rubber raw material and the sulfur are placed and mixed in the twin-screw extruder at the temperature between 80 and 100 degree Celsius; the rubber material mixed with the sulfur is placed in the mold, vulcanization and molding of the rubber raw material are performed at the temperature between 150 and 160 degree Celsius, and the conveyor belt rubber is obtained. A test result of mechanical property and impedance of the conveyor belt rubber of Embodiment 5 is shown in Table 5.

TABLE 5

|  | Content of the graphene additive | | |
|---|---|---|---|
|  | 0% | 8 phr | 20 phr |
| Tensile strength (Kgf/cm$^2$) | 117 | 115 | 111 |
| Elongation (%) | 180 | 182 | 202 |
| Tearing strength (Kgf/cm) | 71 | 77 | 74 |
| Surface resistance (Mohm) | 439 | 0.57 | 0.22 |

As shown in Table 5, the graphene can effectively reduce the impedance of the rubbers, and will not cause a significant decline in the mechanical properties by adjusting the rubber formulation. In the application of the conveyor belt rubber (especially, the conveyor belt for electronic products), the conveyor belt having the antistatic property can prevent damages on the electronic products from static electricity.

The present application provides a graphene lubricating oil including a lubricating oil and the graphene additive, wherein the graphene additive accounts for 0.01-5 wt % of a total weight of the graphene lubricating oil. The graphene additive includes the nano-graphene sheets and the silane coupling agent, the nano-graphene sheets form the chemical bonds Si—O—C with the silane coupling agent, the weight ratio of the nano-graphene sheets to the silane coupling agent is 0.1-15:99.9-85, and the graphene additive has the viscosity between 1000 and 40000 cps and the grind fineness not greater than 15 μm.

Embodiment 6: The Graphene Lubricating Oil

Step of preparing the graphene additive: the nano-graphene sheets of 2 wt % and hexadecyl trimethoxy silane of 98 wt % are added to the homogenizer, mixed for 1 hour, and the graphene-silane fluid having the viscosity of 1000 cps is formed; the graphene-silane fluid is fed into the fluid channel of 500 μm width with the peristaltic pump, the pressure of 8000 psi is applied to the graphene-silane fluid to allow the graphene-silane fluid pass through the slit of 50 μm width, so that the graphene additive is obtained. The grind fineness, measured with the grind fineness meter, of the graphene additive of Embodiment 6 is 8 μm.

Step of mixing the lubricating oil and the graphene additive: the graphene additive of 0.1 g is added to and mixed with a 5W-40 engine oil of 199.9 g, the content of the graphene therein is diluted to 10 ppm, and the graphene lubricating oil having the viscosity of 1000 cps is formed.

A lubricity of the graphene lubricating oil is tested with an abrasion test machine, in case of the abrasion test machine running, weights each of 0.5 kg are put thereon one by one, until the abrasion test machine sounds and is stuck (as a test stop signal). The test results of the original lubricating oil and the graphene lubricating oil of Embodiment 6 are shown in Table 6.

TABLE 6

|  | Content of the graphene | |
|---|---|---|
|  | 0 ppm | 10 ppm |
| Number of the weights | 5 | 12 |
| Load | 2.5 kg | 6 kg |

As shown in Table 6, as long as the graphene of 10 ppm is added to the lubricating oil, the lubricity thereof can be significantly enhanced, and the wear resistance thereof is greatly improved. Moreover, by utilizing the form of the graphene additive, the dispersibility of the nano-graphene sheets in the lubricating oil can be increased, and the sedimentation and agglomeration of the nano-graphene sheets can be obviated.

The present application provides a graphene sponge formed by co-foaming an organic porous sponge and the graphene additive, and the graphene additive accounts for 0.01-10 wt % of a total weight of the graphene sponge. The organic porous sponge is selected from any one of polyurethanes, ethyl-vinyl acetate copolymers, and silicon rubbers. The graphene additive includes the nano-graphene sheets and the silane coupling agent, the nano-graphene sheets are formed the chemical bonds Si—O—C with the silane coupling agent, the weight ratio of the nano-graphene sheets to the silane coupling agent is 0.1-15:99.9-85, and the graphene additive has the viscosity between 1000 and 40000 cps and the grind fineness not greater than 15 μm.

Embodiment 7: The Graphene Sponge

Step of preparing the graphene additive: the nano-graphene sheets of 5 wt % and vinyl trimethyl silane of 95 wt % are added to the homogenizer, mixed for 1 hour, and the graphene-silane fluid having the viscosity of 1500 cps is formed; the graphene-silane fluid is fed into the fluid channel of 500 μm width with the peristaltic pump, the pressure of 9000 psi is applied to the graphene-silane fluid to allow the graphene-silane fluid pass through the slit of 50 μm width, so that the graphene additive is obtained. The grind fineness, measured with the grind fineness meter, of the graphene additive of Embodiment 7 is 10 μm.

Step of diluting the graphene additive: the graphene additive is added to and mixed with a poly propylene glycol by the stirring equipment, and the viscosity of the graphene additive is diluted to 1000 cps.

Step of foaming: a dichloromethane of 120 g, an ethyl acetate of 360 g, a methyl isocyanate of 1040 g and a catalyst of 28 g are added to and uniformly mixed with the graphene additive of 332 g by the stirring equipment, then poured in a foaming tank for foaming at a temperature between 60 and 80 degree Celsius, removed from the stirring equipment, ripened for 24 hours, and the graphene sponge is obtained, wherein the nano-graphene sheets accounts for 2 wt % of a total weight of the graphene sponge.

Common organic sponges are made of hydrophilic materials, so that they can be used for washing or cleaning; the graphene is a lipophilic and hydrophobic material, when the graphene is added to the sponge, the property of the sponge will be reversed to form an oil-absorbing and hydrophobic sponge, which can be applied to oil-water separation such as a waste oil recovery. An oil absorption test of the graphene sponge of Embodiment 7 includes following steps: an oil-water mixture of 500 ml is prepared by mixing an emulsified oil of 300 ml and water of 200 ml; the oil-water mixture passes through the graphene sponge of 5 cm thickness in a way of free-fall; after all the oil-water mixture passed, the oil absorbed in the graphene sponge is extruded, and a volume and a weight of the oil extruded from the graphene sponge are 160 ml and 76 g. Before and after the oil-water mixture passed through the graphene sponge, the chemical oxygen demands of the oil-water mixture are measured, the chemical oxygen demand of the oil-water mixture after the oil-water mixture passed through the graphene sponge has decreased by 50%, the result represents that the graphene sponge can effectively absorb the oil in the oil-water mixture, to achieve the effect of oil-water separation.

The exemplary embodiments described above only illustrate the principles and effects of the present application, but are not intended to limit the scope of the present application. Based on the above description, an ordinarily skilled in the art can complete various similar modifications and arrangements according to the technical programs and ideas of the present application, and the scope of the appended claims of the present application should encompass all such modifications and arrangements.

What is claimed is:

1. A graphene additive, having a viscosity between 1000 and 40000 cps and a grind fineness not greater than 15 µm, and comprising:
    nano-graphene sheets; and
    a silane coupling agent,
    wherein a weight ratio of the nano-graphene sheets to the silane coupling agent is 0.1-15:99.9-85, and carbon atoms on a surface of the nano-graphene sheets form Si—O—C chemical bonds with oxygen substituents of the silane coupling agent.

2. The graphene additive according to claim 1, wherein the silane coupling agent is selected from the group consisting of bis-(3-y-(triethoxysilyl)propyl) tetrasulfide, octadecyl trimethylsilane, hexadecyl trimethoxy silane, dodecyl trimethylsilane, 3-octanoylthio-1-propyltrimethylsilane, 3-octanoylthio-1-propyltriethoxy silane and vinyl trimethylsilane.

3. The graphene additive according to claim 1, wherein each nano-graphene sheet has a plurality of graphene layers, a bulk density of 0.005-0.05 g/cm$^3$, a thickness of 0.68-10 nm, and a plane lateral size of 1-100 µm.

4. The graphene additive according to claim 1, further comprising a processing oil selected from the group consisting of treated distillate aromatic extracted processing oils, paraffin base processing oils, aromatic base processing oils and naphthenic base processing oils.

5. A method of preparing a graphene additive, comprising:
    mixing and stirring nano-graphene sheets and a silane coupling agent, to form a graphene-silane fluid, wherein each nano-graphene sheet has a plurality of graphene layers;
    placing the graphene-silane fluid in a fluid channel having a slit, wherein a width of the fluid channel is not greater than 500 µm, and a width of the slit is not greater than 50 µm, on a direction perpendicular to a flowing path of the graphene-silane fluid;
    propelling the graphene-silane fluid in the fluid channel to pass through the slit by applying a pressure not less than 8000 psi to the graphene-silane fluid, and exfoliating the plurality of graphene layers of the nano-graphene sheets; and
    allowing carbon atoms on a surface of the nano-graphene sheets, which have the exfoliated plurality of graphene layers, to form Si—O—C chemical bonds with oxygen substituents of the silane coupling agent, to form a graphene additive having a viscosity between 1000 and 40000 cps.

6. The method of preparing the graphene additive according to claim 5, wherein the nano-graphene sheets have a bulk density of 0.005-0.05 g/cm$^3$, a thickness of 0.68-10 nm, and a plane lateral size of 1-100 µm.

7. The method of preparing the graphene additive according to claim 5, wherein a weight ratio of the nano-graphene sheets to the silane coupling agent is 0.1-15:99.9-85.

8. The method of preparing the graphene additive according to claim 5, wherein a temperature of the graphene-silane fluid passing through the slit is greater than 60 degrees Celsius.

* * * * *